Patented July 15, 1947

2,424,175

UNITED STATES PATENT OFFICE 2,424,175

VULCANIZATION OF RUBBER OR THE RUBBERY CO-POLYMER OF BUTADIENE AND STYRENE

Paul C. Jones, Silver Lake, and Roger A. Mathes, Akron, Ohio, assignors to The B. F. Goodrich Company, New York, N. Y., a corporation of New York No Drawing. Application December 8, 1943, Serial No. 513,490

13 Claims. (Cl. 260—79)

This invention relates to the vulcanization of rubber and has as its object to provide a new and effective class of vulcanization accelerators.

We have discovered that aminoalkyl sulfides having the general structural formula

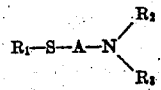

wherein $R_1$ is an organic radical with the free valence on a carbon atom, A is an alkylene group with the free valences on different carbon atoms, $R_2$ is a member of the class consisting of hydrogen, and aliphatic and aromatic groups attached to the nitrogen through a carbon atom, and $R_3$ is an aliphatic group attached to the nitrogen through a carbon atom, are excellent accelerators.

The $R_1$—S— portion of the compound may be regarded as the residue formed by removing the —H from the —SH group of a sulfhydryl compound. Suitable sulfhydryl compounds from which the accelerators of this invention may be considered as derived include methyl mercaptan, ethyl mercaptan, isopropyl mercaptan, allyl mercaptan, cyclohexyl mercaptan, benzyl mercaptan, thiophenol, ortho, meta, or para thiocresol, alpha or beta thionaphthol, 1-thioanthrol, thioanthranol, p-chlorthiophenol, p-methoxythiophenol, o-anilinothiophenol, methanecarbothiolic acid, methanecarbodithioic acid, ethanecarbodithioic acid, benzene-carbodithioic acid, 3-furanecarbodithioic acid, ethyl-xanthogenic acid, dimethyldithiocarbamic acid, methyl-ethyl-dithiocarbamic acid, ethyldithiocarbamic acid, methyl-phenyl-dithiocarbamic acid, ethyl-benzyl-dithiocarbamic acid, diphenyldithiocarbamic acid, phenyl-alpha-naphthyl-dithiocarbamic acid, phenyl-para-chlorphenyl-dithiocarbamic acid, o,o'-dimethyl-methylenediphenyldithiocarbamic acid, phenyl-para - hydroxyphenyl - dithiocarbamic acid, phenyl-anilino-phenyl-dithiocarbamic acid, mercaptothiazole, mercaptobenzothiazole, mercapto-benzoxazole, mercaptobenzimidazole, mercapto-4,5-dimethyl thiazole, mercapto - 4 - methyl-5-ethyl-thiazole, mercapto-4-phenylthiazole, mercaptothiazoline, mercapto-4,5-dimethylthiazoline, mercaptopenthiazoline, mercaptometathiazine, mercaptooxazine, mercaptoquinoline, etc.

A is preferably a lower alkylene group containing not over 6 carbon atoms such as ethylene, propylene, 2-methylethylene, etc., although higher alkylene groups may be present if desired.

$R_2$ and $R_3$ may be aliphatic groups such as alkyl, cycloalkyl, aralkyl, hydroxyalkyl, alkoxyalkyl, aminoalkyl, or haloalkyl groups, while $R_2$ may also be an aromatic group. In the preferred groups of compounds, $R_2$ and $R_3$ are hydrocarbon groups or amino substituted hydrocarbon groups. In the latter case

is derived from polyamines such as ethylene diamine, triethylene tetramine, para-phenylene diamine, etc.

Typical aminoalkyl sulfides within the scope of this invention include:

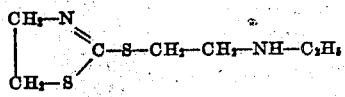

2-thiazolinyl ethylaminoethyl sulfide, 2-thiazolinyl diethylaminoethyl sulfide, 2-thiazolinyl methylaminopropyl sulfide, 2-thiazolinyl dimethylaminobutyl sulfide, 2-thiazolinyl methylphenylaminoethyl sulfide, 2-thiazolinyl butylaminoethyl sulfide, 2-thiazolinyl dibutylaminoethyl sulfide,

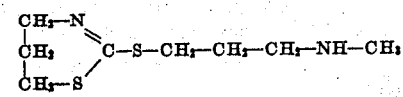

3-penthiazolinyl methylaminopropyl sulfide,

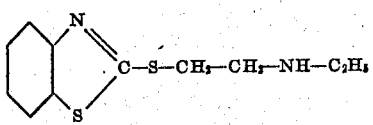

2-benzothiazyl ethylaminoethyl sulfide, 2-benzothiazyl benzylaminoethyl sulfide, 2-benzothiazyl diethylaminoethyl sulfide, 2-benzothiazyl cyclohexylaminoethyl sulfide, 2-benzothiazyl butylaminoethyl sulfide, 2-benzothiazyl dibutylaminoethyl sulfide,

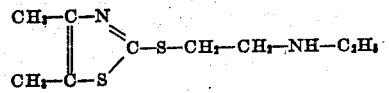

4,5-dimethylthiazyl ethylaminoethyl sulfide,

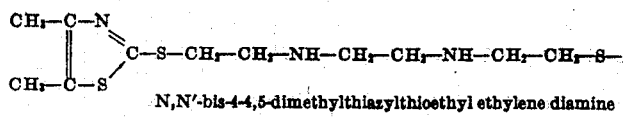

N,N'-bis-4-4,5-dimethylthiazylthioethyl ethylene diamine

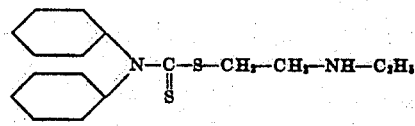

Diphenylthiocarbamyl ethylaminoethyl sulfide

These compounds are readily prepared from the mercapto compounds by reaction with the substituted amino ethyl chlorides in the presence of alkali. The substituted amino ethyl chlorides in turn may be prepared from ethanolamine by first introducing the desired substituent group on the amino nitrogen by a conventional alkylation reaction and then replacing the hydroxyl group with chlorine by means of concentrated hydrochloric acid, thionyl chloride, or the like. As an illustration of such a preparation, N-butyl ethanolamine is converted to butylamino ethyl chloride by treatment with thionyl chloride. Equimolar proportions of 2-mercapto thiazoline and butylamino ethyl chloride are boiled under reflux (at about 102° C.) with a slight excess over two molar proportions of a 40% water solution of caustic alkali. The reaction is substantially complete after 4 hours. The 2-thiazolinyl butylaminoethyl sulfide which is formed is an oil which separates from the water and needs only to be washed with more water and dried. The other compounds referred to herein may be prepared in the same way by selection of the appropriate raw materials in each case.

As a specific example of the method of this invention, accelerators within the class herein defined were incorporated in the following rubber composition:

| | |
|---|---|
| Rubber | 100 |
| Carbon black | 51.5 |
| Zinc oxide | 10 |
| Lauric acid | 3 |
| Sulfur | 3 |
| Antioxidant | 0.75 |
| Accelerator | 1.5 |

When the rubber compositions were cured for 45 minutes at 265° F., vulcanizates having the following properties were obtained, T representing tensile strength at break in lbs./in.$^2$ and E representing ultimate elongation in per cent:

| Accelerator | T | E |
|---|---|---|
| 2-thiazolinyl butylaminoethyl sulfide | 2,300 | 610 |
| butylaminoethyl ester of a mixture of 4,5-dimethyl mercaptothiazole and 4-ethyl mercaptothiazole | 2,700 | 570 |

As another example, accelerators were incorporated in the following synthetic rubber composition, in which they were activated by a secondary accelerator:

| | |
|---|---|
| GR—S (butadiene-styrene copolymer) | 100 |
| Carbon black | 50 |
| Zinc oxide | 10 |
| Sulfur | 2 |
| Antioxidant | 1 |
| 2,4 - dinitrophenyl dimethyldithiocarbamate | 0.4 |
| Accelerator | 1 |

When the compositions were cured for 45 minutes at 265° F., vulcanizates having the following properties were obtained:

| Accelerator | T | E |
|---|---|---|
| 2-mercapto benzothiazole (control) | 1,650 | 280 |
| 2-benzothiazyl butylaminoethyl sulfide | 1,850 | 440 |
| 2-benzothiazyl dibutylaminoethyl sulfide | 1,500 | 600 |
| butylaminoethyl ester of a mixture of 4,5-dimethyl mercaptothiazole and 4-ethyl mercaptothiazole | 1,500 | 490 |
| dibutylaminoethyl ester of a mixture of 4,5-dimethyl mercaptothiazole and 4-ethyl mercaptothiazole | 1,650 | 480 |
| 2-thiazolinyl butylaminoethyl sulfide | 1,500 | 350 |
| 2-thiazolinyl dibutylaminoethyl sulfide | 1,700 | 310 |

It is particularly noteworthy that these new accelerators give rise to stocks having markedly greater ultimate elongation than those containing conventional accelerators such as 2-mercapto benzothiazole, and having a comparable or greater strength, thus overcoming one of the disadvantages of this type of synthetic rubber.

It will be noted that lauric acid was included in the above compositions. It is generally true of the accelerators of this invention, however, that they do not require any acid to effect good cures, regardless of the activity of the compounds from which they are derived.

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize not only natural rubber or caoutchouc but also balata, gutta percha, synthetic rubber of the types which undergo vulcanization when heated with sulfur, or natural or artificially prepared latex; that the accelerators may be incorporated in the rubber by mastication or milling, or in the case of latex or other dispersion or solution, by simply dissolving or suspending the accelerator therein; that the accelerators may be used in admixture with each other or with other known accelerators or with antioxidants, organic acids, amines, softeners, activators, retarders, pigments, fillers, etc.; and that the rubber may be vulcanized with the assistance of this new class of accelerators in heated molds, hot air, steam, hot water, etc. The accelerators of this invention may advantageously be used in as low a proportion as 0.05% of the rubber in the composition, in which case 3 to 5% of sulfur is generally required or as high as 5%, with a much reduced quantity of sulfur.

This invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

This is a continuation in part of our copending application Serial No. 307,635, filed December 5, 1939.

We claim:

1. The method which comprises vulcanizing a vulcanizable material selected from the class consisting of rubber and butadiene styrene copolymer synthetic rubber in the presence of 2 to 5% by weight based on the vulcanizable material of sulfur and in the additional presence of 0.05 to 5% by weight based on the vulcanizable material of a compound having the structural formula

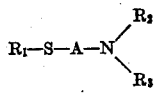

wherein $R_1$ is an organic radical with the free valence on a carbon atom, A is an alkylene group with the free valences on different carbon atoms, $R_2$ is a member of the class consisting of hydrogen, and aliphatic and aromatic groups attached to the nitrogen through a carbon atom, and $R_3$ is an aliphatic hydrocarbon group.

2. The method which comprises vulcanizing a vulcanizable material selected from the class consisting of rubber and butadiene styrene copolymer synthetic rubber in the presence of 2 to 5% by weight based on the vulcanizable material of sulfur and in the additional presence of 0.05 to 5% by weight based on the vulcanizable material of a compound having the structural formula

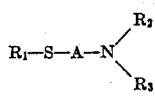

wherein $R_1$ is an organic radical with the free valence on a carbon atom, A is an alkylene group containing not over six carbon atoms and with the free valences on different carbon atoms, $R_2$ is hydrogen and $R_3$ is an aliphatic group attached to the nitrogen through a carbon atom.

3. The method which comprises vulcanizing rubber in the presence of 2 to 5% by weight based on the rubber of sulfur and in the additional presence of 0.05 to 5% by weight based on the rubber of a thiazyl alkylaminoethyl sulfide.

4. The method which comprises vulcanizing a butadiene styrene copolymer synthetic rubber in the presence of 2 to 5% by weight based on the synthetic rubber of sulfur and in the additional presence of 0.05 to 5% by weight based on the synthetic rubber of a thiazyl alkylaminoethyl sulfide.

5. The method of claim 4 wherein the thiazyl alkylaminoethyl sulfide is 2-benzothiazyl alkylaminoethyl sulfide.

6. The method which comprises vulcanizing a vulcanizable material selected from the class consisting of rubber and butadiene styrene copolymer synthetic rubber in the presence of 2 to 5% by weight based on the vulcanizable material of sulfur and in the additional presence of 0.05 to 5% by weight based on the vulcanizable material of a 2-thiazolinyl alkylaminoethyl sulfide.

7. The method which comprises vulcanizing butadiene styrene copolymer synthetic rubber in the presence of 2 to 5% by weight based on the synthetic rubber of sulfur and in the additional presence of 0.05 to 5% by weight based on the synthetic rubber of a compound having the structural formula

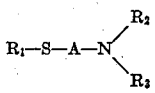

wherein $R_1$ is an organic radical with a free valence on a carbon atom, A is an ethylene group, and

is an alkyl-hydrocarbon substituted amino group.

8. An unvulcanized composition containing a predominant amount of a material selected from the class consisting of rubber and butadiene styrene copolymer synthetic rubber and also containing sulfur and from 0.05 to 5% by weight based on the said material of a compound having the structural formula

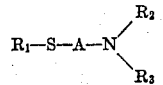

wherein $R_1$ is an organic radical with the free valence on a carbon atom, A is an alkylene group with the free valences on different carbon atoms, $R_2$ is a member of the class consisting of hydrogen, and aliphatic and aromatic groups attached to the nitrogen through a carbon atom, and $R_3$ is an aliphatic hydrocarbon group.

9. An unvulcanized composition containing a predominant amount of a material selected from the class consisting of rubber and butadiene styrene copolymer synthetic rubber and also containing sulfur and from 0.05 to 5% by weight based on the said material of a compound having the structural formula

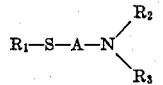

wherein $R_1$ is an organic radical with the free valence on a carbon atom, A is an alkylene group containing not over six carbon atoms and with the free valences on different carbon atoms, $R_2$ is hydrogen and $R_3$ is an aliphatic group attached to the nitrogen through a carbon atom.

10. An unvulcanized rubber composition containing a predominant amount of rubber together with sulfur and from 0.05 to 5% by weight based on the rubber of a thiazyl alkylaminoethyl sulfide.

11. An unvulcanized synthetic rubber composition containing a predominant amount of butadiene styrene copolymer synthetic rubber together with sulfur and from 0.05 to 5% by weight based on the synthetic rubber of a thiazyl alkylaminoethyl sulfide.

12. The composition of claim 11 wherein the thiazyl alkylaminoethyl sulfide is a 2-benzothiazyl alkylaminoethyl sulfide.

13. An unvulcanized composition containing a predominant amount of a material selected from the class consisting of rubber and butadiene styrene copolymer synthetic rubber and also containing sulfur and from 0.05 to 5% by weight based on the said material of a 2-thiazolinyl alkylaminoethyl sulfide.

PAUL C. JONES.
ROGER A. MATHES.

REFERENCES CITED

The following references are of record in the file of this patent:

UNITED STATES PATENTS

| Number | Name | Date |
|---|---|---|
| 2,177,548 | Jones | Oct. 24, 1939 |

Certificate of Correction

Patent No. 2,424,175.  July 15, 1947.

PAUL C. JONES ET AL.

It is hereby certified that error appears in the printed specification of the above numbered patent requiring correction as follows: Column 3, line 5, for that part of the compound reading "N,N'-bis-4-4,5-" read *N,N'-bis-4,5-*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.*